July 7, 1970          F. L. YERZLEY          3,518,876

MECHANICAL OSCILLOGRAPH

Filed Aug. 8, 1968          7 Sheets-Sheet 6

INVENTOR.
FELIX L. YERZLEY
BY
Kenyon & Kenyon
ATTORNEYS

United States Patent Office 3,518,876
Patented July 7, 1970

3,518,876
MECHANICAL OSCILLOGRAPH
Felix L. Yerzley, Verona, N.J., assignor to Yerzley & Co., Newark, N.J., a corporation of New Jersey
Filed Aug. 8, 1968, Ser. No. 751,293
Int. Cl. G01b 5/30
U.S. Cl. 73—88                    14 Claims

ABSTRACT OF THE DISCLOSURE

The oscillograph is provided with knife edges which make point-to-point contact with a bearing groove formed by digitated engaging bearing blocks. In addition, the chronograph drum is mounted in fixed bearings at top and bottom so as to rotate in a fixed vertical axis. The supply of ink to the recording pen is delivered from a reservoir which is adjustable in height with respect to the pen so that ink supply to the tip of the pen is controlled. A plurality of knife edges are arranged along the beam so as to provide different mounting points for a test specimen. Additional, a linkage assembly in parallelogram form is used to maintain the specimen support in a horizontal plane at all times substantially without friction.

This invention relates to a mechanical oscillograph. More particularly, this invention relates to an oscillograph apparatus for testing resiliency, elastic modulus and other characteristics of deformable specimens.

Oscillographs have been known, for example, as in U.S. Pat. 3,354,701, wherein a beam which is mounted for pivoting about a fulcrum and initially locked in position receives a test specimen at one end and an unbalancing force at the other end. In addition, the beam cooperates with a fixed platen at the test specimen end against which the test specimen is initially positioned and a pen at the other end for recording the oscillations or amount of deflection of the beam on a chronograph chart upon unlocking of the beam. In practice, such oscillographs may be utilized in accordance with test standards, ASTM D–945 for example.

Briefly, the mechanical oscillograph functions on the properties of a beam pivoted at its center and operable over an angular range of plus or minus five degrees (5°) from the horizontal. A test specimen on the beam to one side of the center can be forced against a stationary position by adding removable weights to the beam on the other side of the pivot. Extent of the beam movement is recorded by a pen extension of the weighted end of the beam. Deformation of the specimen under a given load shows as an extent of vertical motion of the pen. The chart may be moved in a horizontal direction in an amount proportional to the value of the weights. Thus one can obtain static load deformation characteristics of a specimen by loading and then by reversing or unloading a mechanical energy loss loop may thus be obtained. Rubber specimens have hysteresis loops. Geometric precision and amount of friction determine the quality of results obtainable.

If a test specimen under a constant load tends to show increasing deformation with elapsed time it is said to creep. Creep can be recorded as increasing pen travel on a chart which is rotated at a known rate. The oscillograph is adapted to make such tests. Many rubber compounds show substantial creep. Window putty shows extreme creep. An automobile valve spring shows negligible creep.

If the beam is held in an elevated position, with an inserted test specimen unloaded and undeformed in test position, the beam can be preloaded for a dynamic test. If the beam is then released the weights will fall under the influence of gravity. They will be retarded by the reaction of the test specimen. Energy into the specimen can be calculated from the vertical fall of the known weights. The energy returned to the beam can be calculated from the height recovered. The sequence of oscillations of the beam is recorded as an approximately sinusoidal inked line on the rotating oscillogram or chart, which is mounted on the chronograph drum. Resilience, dynamic modulus and inferences regarding the type of damping can be evaluated. Precise values must be obtainable for frequency of oscillation, moment of inertia of the beam system and the actual forces applied to the specimen. The improvements of the oscillograph which make this precision and greater utility practical amount to a breakthrough in testing technology and are the substance of this invention.

While these heretofore known oscillographs have been adequate in use for testing vulcanized test specimens, such have not usually been adequate or flexibly adaptable to use for a broad variety of test specimens made in a variety of sizes and of other materials, such as, steel. Further, these known oscillographs have not been capable of a high degree of precision. In this invention, a new way has been found to engage the knife edges in V-shaped bearings to eliminate all rubbing play longitudinally along the beam. Even where such play amounts only to thousandths of an inch, as in earlier oscillographs, wear contributing to frictional losses can occur. Since the improved oscillograph has efficiency exceeding 99.85% the need for practically perfect knife edges and bearings is apparent.

In previous oscillographs the bearing for the knife edge supporting the test specimen rather than the knife edge was part of the beam assembly, and since the knife edge could assume numerous positions in the bearing, and was never determinable, the lever distance from the knife edge at the beam center to the floating knife edge supporting the test specimen was indeterminate to the extent of several thousandths of an inch. As a result of the present invention, knife edges can be fixed on the beam to the nearest ten thousandth of an inch and the setting is stable.

Further, the accuracy of the known oscillographs has frequently been limited due to the manner of mounting of the test specimen on the beam. That is, the test specimens have in some instances been mounted directly on a support which is pivotally mounted on the beam, as by a knife edge, and extensions of the specimen support have been guided in a vertical plane so that as the beam pivots the test specimen remains positioned between two approximately parallel surfaces. However, such an arrangement has had a relatively large amount of friction attendant therewith during operation due to the mechanisms used to guide the specimen support even in the cases where antifriction bearings have been used to reduce friction. Further, such arrangements have also allowed the beam to tilt slightly during an oscillation thus causing further inaccuracies in the testing procedures.

Accordingly, it is an object of the invention to increase the degree of accuracy of an oscillograph.

It is another object of the invention to maintain the recording drum of a chronograph in a vertical axis during rotation thereof in a manner to eliminate an external support of the top bearing which is a great handicap to the operator in installing and removing charts before and after tests.

It is another object of the invention to mount a knife edge of a beam on a mounting block having a groove with a bottom defined by a projected point.

It is another object of the invention to maintain the support of a test specimen in a level horizontal position during oscillation of an oscillograph beam.

It is another object of the invention to provide a test machine applicable to deformable materials or systems of materials to measure load, deformation and time relationships.

It is another object of the invention to provide a test machine for testing elastomers for resilience, dynamic modulus, static modulus, kinetic energy, creep and set.

It is another object of the invention to provide a test machine for determining static load deformation properties and moduli for elastomers, springs, cantilever beams, plastics, simple spans and the like.

Briefly, the invention provides an oscillograph having a very high degree of accuracy, for example, to 1 part in 5,000 parts. The oscillograph includes a beam which is pivotally mounted by a depending knife edge on a mounting block having a V-shaped groove in which the bottom of the groove is mathematically defined by a projected point so that the beam is pivotal on a substantially frictionless point-to-point fulcrum. The beam further mounts a specimen mounting block thereon in a similar frictionless point-to-point fulcrum relation. Also, the specimen mounting block is interconnected with the fulcrum point of the beam through a pantograph assembly so that the surface on which a test specimen is to be mounted remains horizontal during oscillation of the beam in an arcuate path. Further, the beam cooperates with a recording drum which is rotatably mounted on a vertical axis and which is retained on the vertical axis during rotation so as to accurately record the beam oscillations.

The point-to-point fulcrum for the beam on the mounting block is accomplished by providing the mounting block with a pair of digitated blocks of hard material which are interengaged with each other and which have oppositely inclined surfaces which form the V-shaped groove and the projected point bottom of the groove. Since these mounting blocks can be easily formed or ground and polished to have optically flat surfaces, the interengaged digits of the blocks define a groove bottom of precise shape, i.e., a bottom which is defined by a projected point. Because of the point-to-point contact, friction between the beam and mounting block is reduced to a minimum during pivoting of the beam in the groove of the mounting block.

The specimen mounting block is mounted on the beam over a knife edge fixed on the beam surface and includes a pair of oppositely inclined interengaged digitated mounting blocks, as above, which define a groove in which the knife edge is received in point-to-point relation. In this manner, when a test specimen is mounted on the surface of the specimen mounting block and the beam is oscillated about its fulcrum, the specimen mounting block is allowed to rock on the respective knife edge to maintain the test specimen on a horizontal plane. Furthermore, the pantograph assembly is connected to the specimen mounting block and to a point coincident with the fulcrum point of the beam so that the mounting block is fixed in a horizontal plane despite the pivoting of the beam. To this end, the specimen mounting block is secured to a depending yoke and a link is hinged to the bottom of the yoke and the point in the oscillograph structure coincident with the beam fulcrum point. The mounting of the link is such that the link is parallel to the beam and remains parallel thereto during oscillation of the beam.

These and other objects of the invention will become more apparent from the following detailed description taken in conjunction with the accompanying drawings in which:

FIG. 5 illustrates a view of the beam mounting taken on line 5—5 of FIG. 3;

FIG. 13 illustrates a modified assembly similar to FIG. 12 for measuring elasticity.

The oscillograph 20 includes a support 21 of rectangular box-like configuration having a central opening 22 therein, a beam 23, pivotally mounted over the support 21 in line with the opening 22, a fixed platen assembly 24 over one section of the beam 23 and a chronograph 25 at the opposite end of the beam 23.

Referring to FIGS. 1, 2, 3 and 5, the beam 23 is formed as an I-beam so as to provide greater rigidity without increasing the moment of inertia and includes a yoke assembly 26 at a point near the center thereof which serves to pivotally mount the beam on a mounting block assembly 27 secured on the support 21. The yoke assembly 26 includes a pair of vertically upstanding bars 28 secured on the beam 23, as by welding, a horizontal plate 29 secured across the top surfaces of the bars 28, as by threaded bolts, and a knife edge assembly 30 which is adjustably mounted on the underside of the plate 29, as by threaded bolts 31. The knife edge assembly 30 includes a bar 32 of hard steel or equivalent of triangular cross section having an optically straight and sharp depending apex which is rigidly secured within a mounting plate 33 of the knife edge assembly 30. The mounting block assembly 27 includes a pair of vertically disposed bars 35 which are removably secured on the support 21 as by threaded bolts 36 (FIG. 1), a horizontally disposed cross bar 37 extending across the top surfaces of the vertical bars 35 through the yoke assembly 26 of the beam 23, and a knife edge receiving assembly 38 secured to the cross bar 37. The knife edge receiving assembly 38 includes a block 39 of U-shaped cross section, a pair of inserts 40 within the block 39 forming a V-shaped groove and a pair of bearing assemblies at the ends of the block 39. Each bearing assembly (FIG. 5) includes a stop plate 41 removably secured to the end of the block 39, a ball bearing 42 mounted within the stop plate 41, and a spring 43 which biases the ball bearing 42 toward the inserts 40 within the block 39. Each insert 40 is made of a hard material such as agate and is formed with a digitated edge facing the opposite insert (of FIG. 8). The inserts 40 are interengaged with each other and have downwardly inclined polished and optically flat upper surfaces which form the V-shaped groove, the bottom of which mathematically defines a projected point. The bottom of the groove receives the apex of the knife edge 32 of the yoke assembly 26 so as to pivotally support the beam 23 in a point-to-point contact relationship.

Referring to FIG. 5, the knife edge 32 is of a length for example, of three inches, which is slightly less for example, by .002 inch than the over all length of the bearing groove formed by the inserts 40. Further, each of the ball bearings 42 is positioned with respect to the inserts 40 so that the horizontal diametric line of each ball bearing lies in the same line as the bottom of the groove formed by the inserts 40. In this way, should the knife edge 32 shift laterally within the recesses, the knife edge will contact the ball bearing 42 in the direction of shift in a point-to-point relationship due to the tangency of the side edge of the knife edge with the surface of the ball bearing. In this way, friction between the knife edge and the knife edge receiving assembly is reduced to a minimum since there is only point-to-point contact at all planes of contact.

Referring to FIGS. 1, 2, 3 and 4, a test specimen mounting assembly 44 is pivotally mounted on the beam 23 to one side of the yoke assembly 26 to receive and support the specimen to be tested. This mounting assembly 44 includes a knife edge assembly 45 similar to that described above which is removably and adjustably secured to the beam as by bolts 46. The adjustment is obtainable because substantial clearance is provided all around the bolts 46 by making over size mounting holes in the knife edge mounting plate 33. Each knife edge therefore can be accurately positioned to the nearest ten thousandth of an inch before bolts 46 are tightened. In addition, the assembly 44 includes a knife edge receiving assembly 47 including a block 39' of U-shaped cross-section and a pair of inserts 40', as above, and a specimen mounting plate 48 secured to the top of the knife edge receiving assembly 47 in an offset manner.

Figure 4:
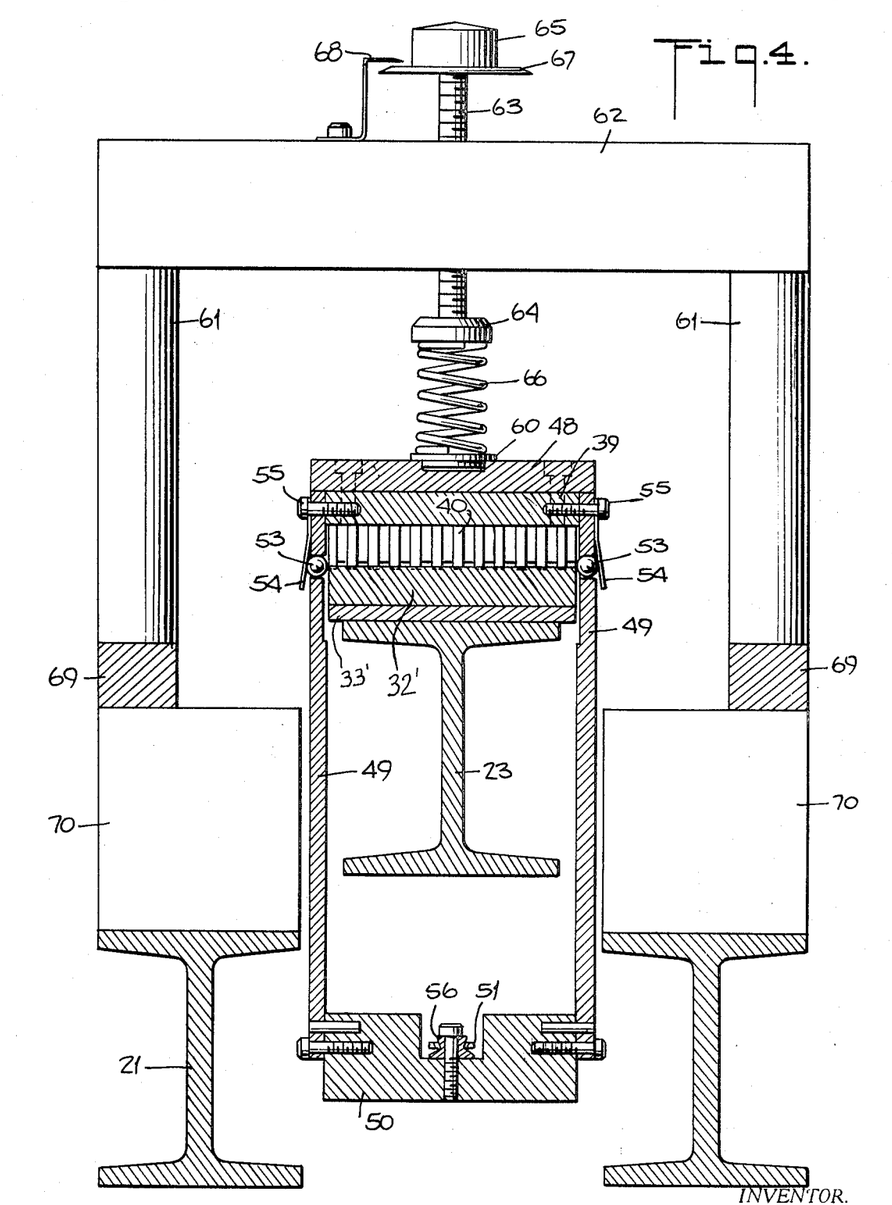
FIG. 4 illustrates a view of the specimen mounting block taken on line 4— 4 of FIG. 3.

Referring to FIGS. 4 and 5 for purposes of stabilization, the mounting assembly 44 includes a yoke having a pair of depending arms 49 on opposite sides of the block 39' of the knife edge receiving assembly 47 and a block 50 secured horizontally across the lower ends of the depending arms 49. Also, a link 51 is hingedly mounted on the block 50 and on a bracket 52 fixed to a suitable cross-piece of the support 21. Each arm has a ball bearing 53 mounted therein which is biased against the inserts 40' within the block 39' by a leaf spring 54 (similar to 43) secured to the outside of the arm 49 in a cantilevered manner by a threaded bolt 55. As above, the ball bearing 53 is mounted so that the horizontal diametric line lies substantially in the same line as the bottom of the groove formed by the inserts 40'.

Figure 7:
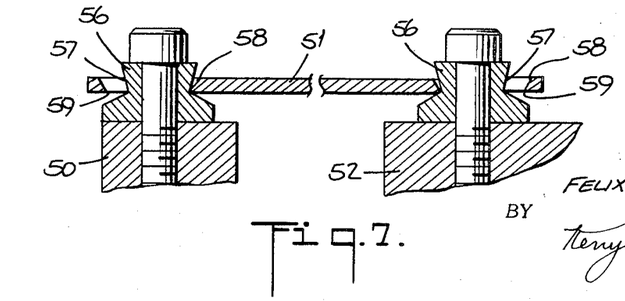
FIG. 7 illustrates a fragmentary view of the link of the pantograph system according to the invention.

Referring to FIG. 7, in order to mount the link 51, the block 50 as well as the brackets 52 are each provided with a removably mounted hardened steel bearing spool 56 of upstanding annular shape having a contour defining a horizontal peripheral groove 57. The link 51 has an aperture 58 at each end thereof, each of which is enclosed by a chamfer on one side of the link 51 so that a sharp knife edge 59 is formed. The link 51 is fitted over each of the bearing spools 56 so that the knife edges 59 about the apertures 58 contact each of the grooves 57 in point-to-point contact. The link 51 is dimensioned so that the distance between the apertures 58 are spaced a distance which is precisely equal to the spacing between the knife edges 32, 32' of the respective assemblies 30, 45. Additionally, the link 51 is parallel to the beam 23. A weight 59' is further secured in depending manner to the link 51 so as to maintain the link 51 in a level condition. The depending arms 49 and link 51 together with the beam and the fixed members thus form a parallel linkage assembly which serves to keep the specimen mounting plate 48 level at all times and which serves to eliminate tilting of the specimen mounting plate 48 during operation of the oscillograph and thereby improves the precision of the measurement of the oscillograph.

The specimen mounting plate 48 further includes a platform 60 of annular shape which is inserted within the mounting plate at a central point thereof. This platform 60 is disposed on a vertical axis which is offset from the knife edge 32' in a direction away from the yoke assembly 26 so as to create a slight torque on the arms 49. This torque imposes a squeezing effect on the link 51 to maintain the link 51 in contact with both bearing spools 56. A weight W can also be secured to the arms 49 to increase the squeeze on the link 51.

Figure 3:
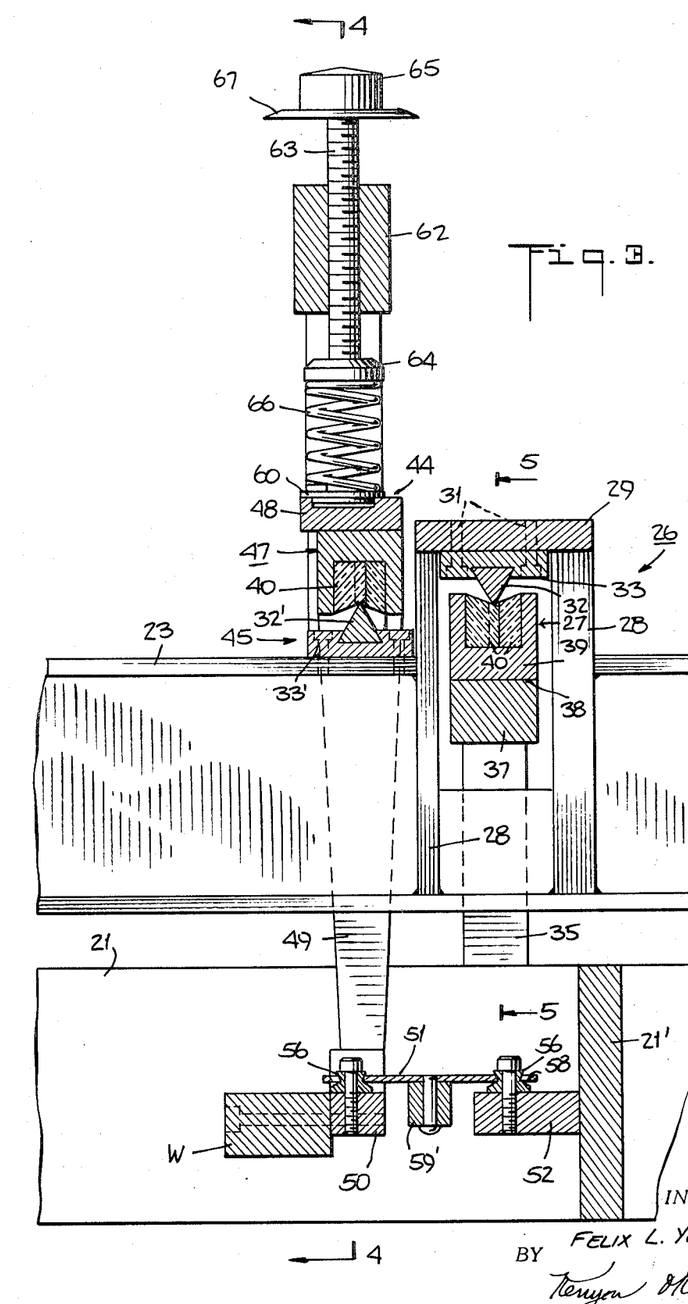
FIG. 3 illustrates a view of the point-to-point mounting of the beam and specimen mounting block taken on line 3—3 of FIG. 1.

Referring to FIGS. 3 and 4, the platen assembly 24 is constructed with a pair of vertical columns 61, for example, columns which are made up of a plurality of individual annular segments so that the height of the column can be varied. The columns 61 support a horizontal cross bar 62 which extends across the beam 23 over the plane of the platform 60. In addition, a threaded screw 63 is threaded vertically through the cross bar 62 and includes an abutment head 64 at the lower end and a knob 65 at the upper end. Upon rotation of the screw 63, the height of the abutment head 64 relative to the platform 60 can be varied to adapt to the size of the test specimen which is to be tested, for example, a coil spring 66. In order to adjust the abutment head 64 to a predetermined point above the platform, a dial indicator 67 is fixed to the screw 63 above the cross bar 62 to cooperate with an indicator needle 68 mounted on the cross bar 62 to indicate the height of the abutment head above the platform 60.

Figure 1:
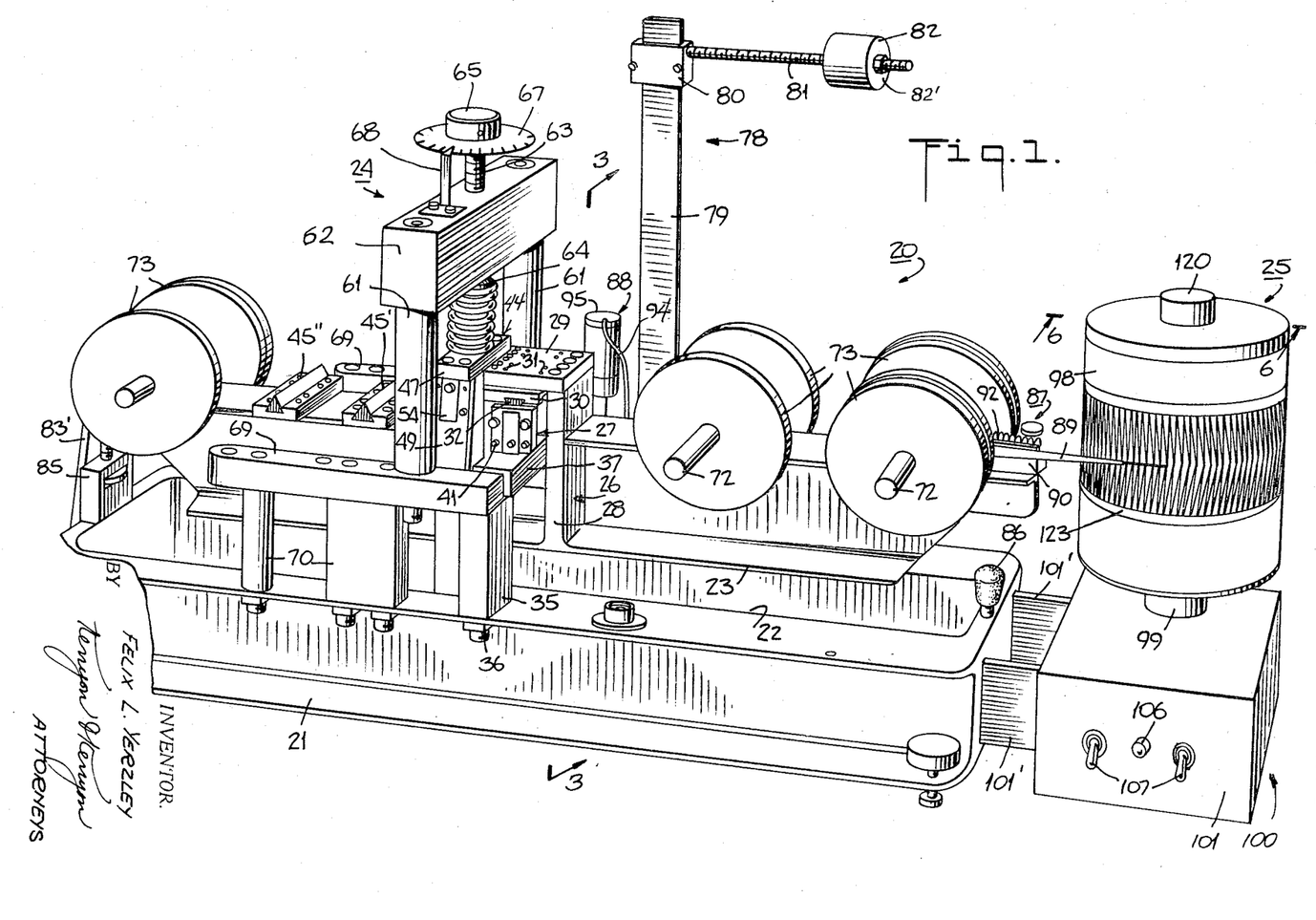
FIG. 1 illustrates a perspective view of an oscillograph according to the invention.

Referring to FIG. 1, the platen assembly 24 is adjustably mounted along a pair of parallel rails 69 located on opposite sides of the beam 23; the rails 69 being removably secured to the support 21 via the bars 35 and suitable support elements 70. In addition, a plurality of knife edge assemblies 45', 45'', as above described, are mounted between the rails 69 on the surface of the beam 23 to provide alternate positions for placement of the test specimen on the beam 23 relative to the fulcrum of the beam 23. For example, the knife edge assemblies 45, 45', 45'' are precisely positioned by optical and mechanical procedures at points spaced 1.600, 4.000 and 6.400 inches from the fulcrum.

Figure 2:
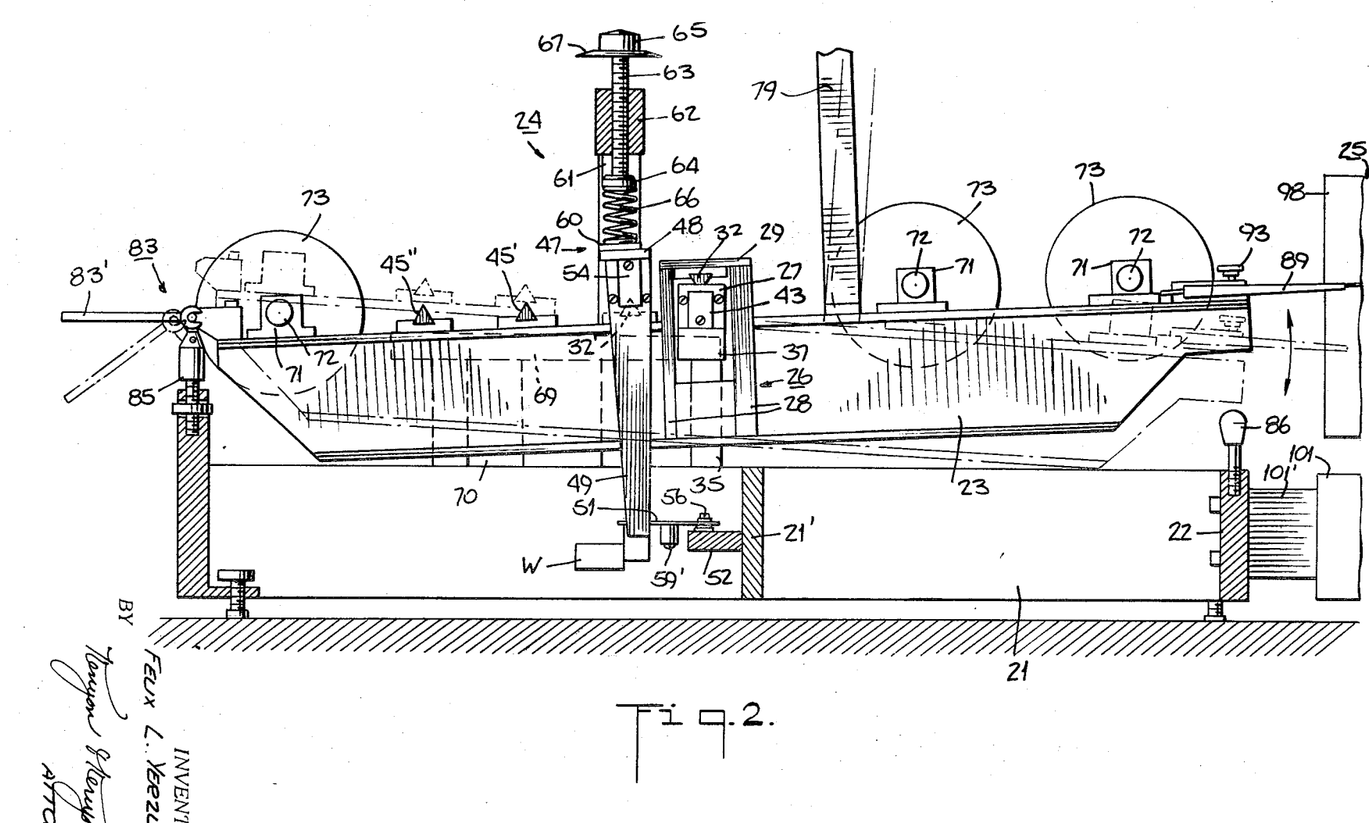
FIG. 2 illustrates a partial cross-sectional side view of the oscillograph of FIG. 1.

Referring to FIGS. 1 and 2, the beam 23 has a plurality of mounting blocks 71 also secured thereon at precisely determined points, for example, a pair of mounting blocks are mounted to the side of the beam opposite the test specimen mounting assembly 44 and a single mounting block on the same side as the test specimen mounting assembly. Each mounting block 71 includes a shaft 72 which extends outwardly of both sides of the block 71 transversely of the beam 23 for supporting standard weights 73 thereon. As shown, the shaft 72 and weights 73 are circular and the weights 73 are centrally apertured to be mounted on the shaft by passage over the shaft 72.

Figures 10, 11:
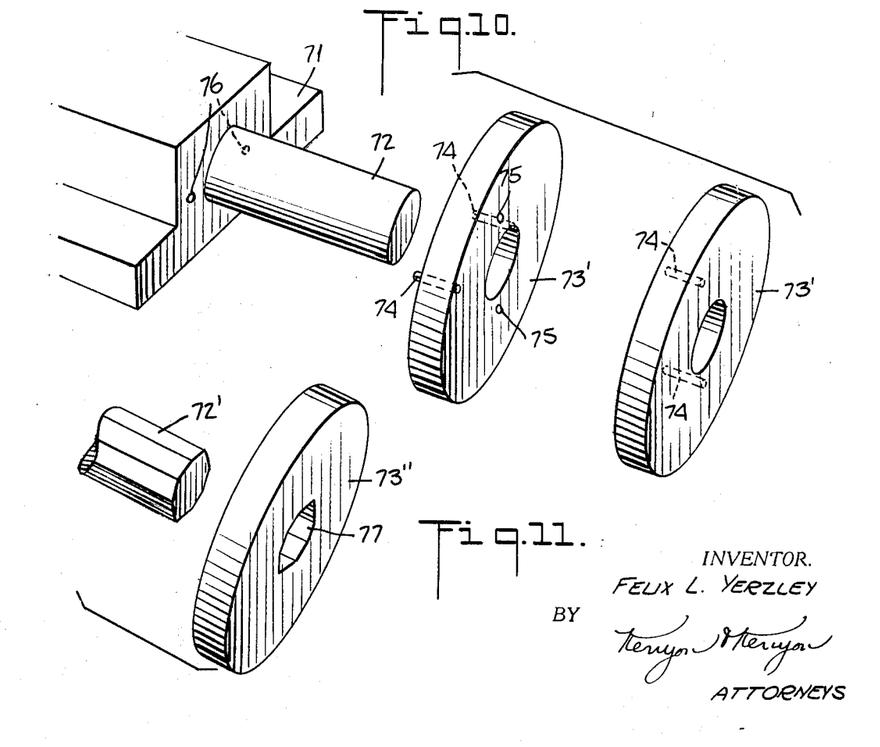
FIG. 10 illustrates an exploded view of the mounting for a plurality of weights on the oscillograph according to the invention.
FIG. 11 illustrates a broken view of a modified mounting of the weights on the oscillograph.

Referring to FIG. 10, in order to prevent rotation of the weights 73' on the mounting block shafts 72, each weight 73' is provided with a pair of axially directed outstanding pins 74 on one side and a pair of holes 75 on the other side offset 180° from the pins 74. Additionally, the mounting block 70 is provided with a pair of holes 76 which are sized to receive the pins 74 of the first mounted weight 73'. The successively mounted weights 73' are mounted so that the pins 74 of one weight reside within the holes 75 of the adjacent weight.

Referring to FIG. 11, the rotation of the weights on the mounting block can otherwise be prevented to avoid stray energy loss due to friction by forming the shaft 72' with a polygonal shaped cross section and by forming the central openings of the weights 73'' with complementary openings 77.

Referring again to FIG. 1, a counter balance assembly 78 is mounted on the top of the beam 23 so as to adjust the center of gravity of the beam 23 to coincide with the line of the knife edge 32 of the knife edge assembly 30. This counter balance assembly 78 includes a vertical post 79 extending up from the beam 23, a support bracket 80 adjustably mounted on the post 79 for vertical movement therealong, a threaded shaft 81 extending outwardly of the bracket 80 in a plane substantially parallel to the beam 23, and a counterweight 82 and lock nut 82' which is vertically mounted on the shaft 81 for rotation longitudinally therealong. The bracket 80 is provided with a threaded horizontal bore so that the threaded shaft 81 can be threaded into either side of the bracket 80 so as to extend in opposite directions with respect to the fulcrum of the beam 23 on the support 21. By suitable location and fastening of bracket 80 along the height of the post 79, the combined center of gravity of the beam and mounted parts can be brought exactly into the common plane of the knife edges 32, 32' and any additional knife edges such as 45' and 45" and the centers of the rods 72. As a secondary operation, threaded shaft 81 and counterweight 82 are thereafter adjusted horizontally until the beam assembly including the specimen specifically under test, but excluding unbalanced weights, have their combined center of gravity exactly in the line of central knife edge 32. The beam is neutral when resting on knife edge 32. This condition is required for exact compliance of the dynamic action of the oscillograph with my published theory.

Referring to FIG. 2, a release assembly 83 is mounted at one end of the support 21 adjajcent the end of the beam 23 so as to hold the pen end of the beam 23 in the elevated position preparatory to staring a dynamic test. By releasing the beam, energy is delivered to the test specimen and oscillations ensue. This release assembly 83 includes a pivotally mounted swivel washer with handle 83' which engages over a suitably shaped pin 84, e.g., of circular cross-section, secured to the end of the beam 23 by a bracket 84'. In addition, the release assembly 83 includies a vertical adjustment assembly 85 so that the handle 83' can be adjusted in height relative to the support 21 so as to maintain the beam 23 initially at a suitably elevated starting position approximately 4° above the horizontal. This vertical adjustment assembly 85 is of generic construction and therefor no need is believed necessary to further describe such. Similarly, a stop 86 is mounted at the opposite end of the support 21 to engage the underside of the end of the beam 23 so as to prevent excessive travel of the beam 23. This is also of known construction and therefor is not further described.

Figures 8, 9, 18:
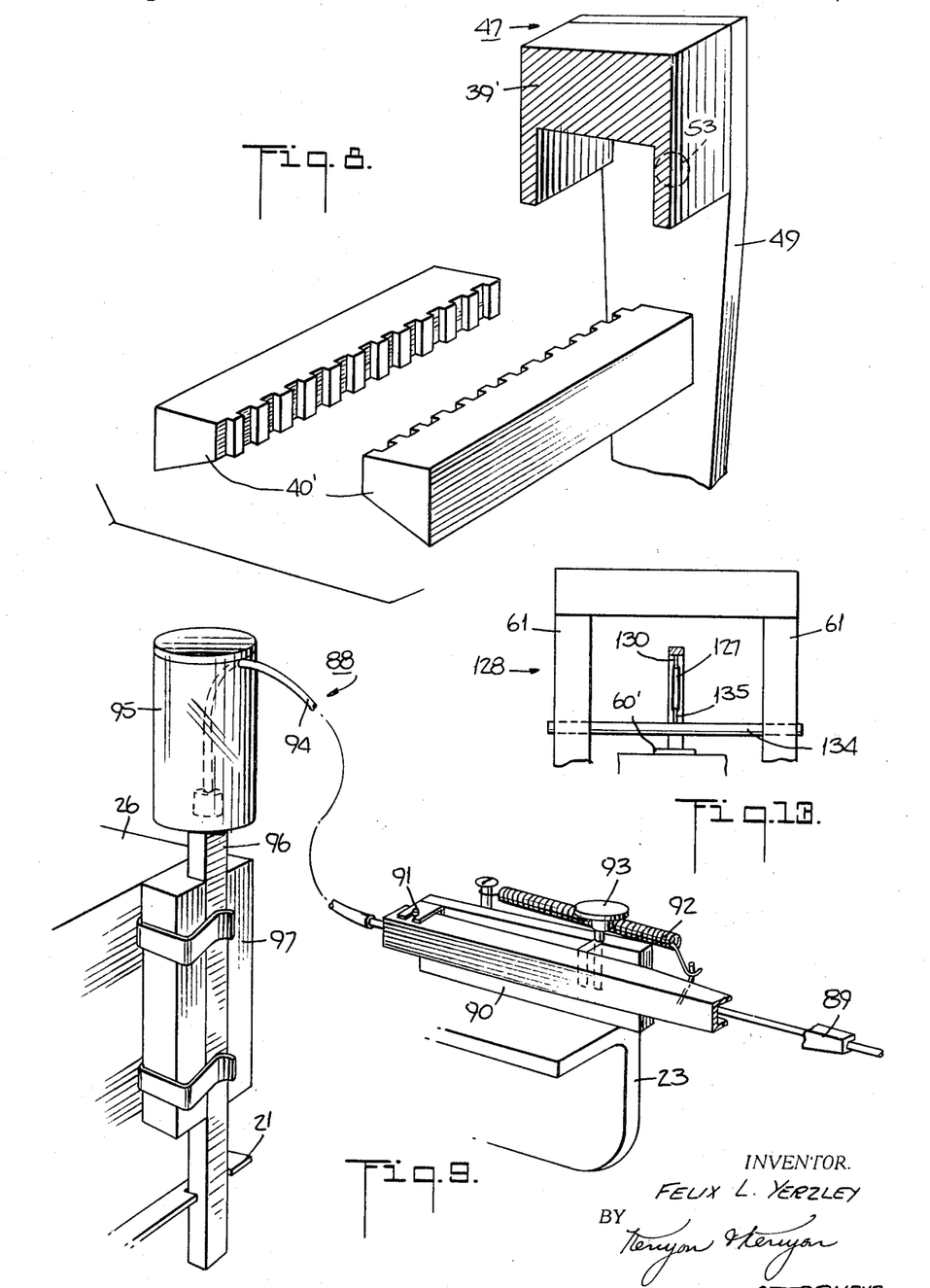
FIG. 8 illustrates a partially exploded view of the specimen mounting block.
FIG. 9 illustrates a perspective fragmentary view of an ink supply for the recording needle of the oscillograph according to the invention.
Figure 9:
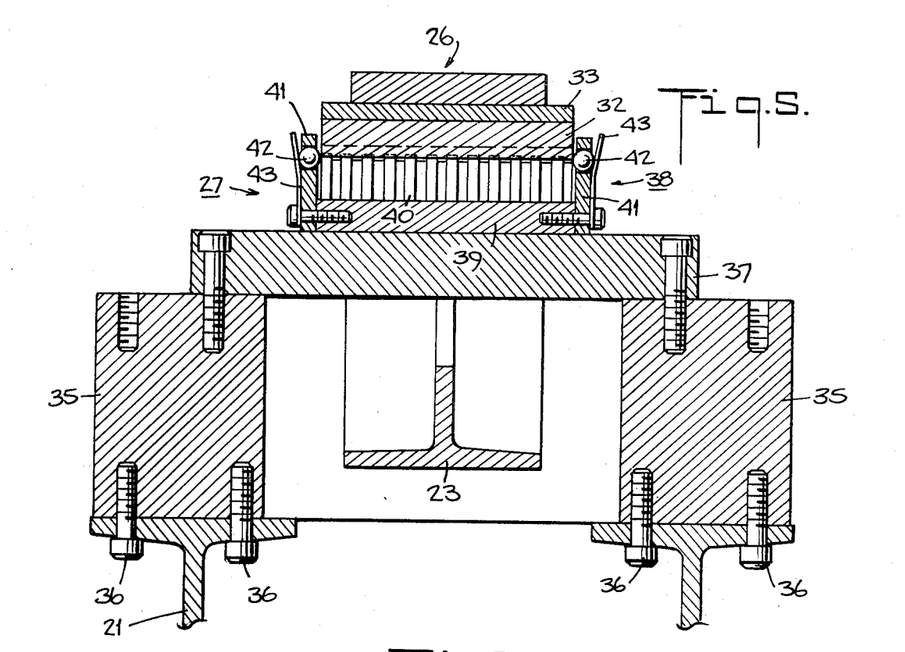

Referring to FIGS. 1, 2 and 9, a recording pen assembly 87 is mounted at the end of the beam adjacent the chronograph 25 and an ink supply system 88 is mounted at an intermediate point along the beam and support 21. The recording pen assembly 87 includes a recording pen 89 hingedly secured as by a hinge pin 91 at one end to a suitable longitudinally adjustable bracket 90 on the beam 23. In addition, the recording needle 89 is delicately spring biased against the bracket 90 and the chronograph drum and chart by spring 92 mounted on the opposite side of the bracket 90. Preadjustment of spring 92 maintains contact with the chart with minimum pressure and friction and also helps to eliminate recording errors due to slackness and play at the hinge pin 91. (The pen can be raised or lowered into contact with the chart by rotation through a fraction of a turn of the pen lift cam device 93.) The ink supply system 88 which supplies ink to the recording pen 89 via a flexible tube 94 includes a reservoir 95 for containing a supply of ink and a support shaft 96 which is slidably mounted in the support 21 and in a suitable bracket 97 on the yoke assembly 26. Depending upon the amount of ink within the reservoir 95, and the speed and average height of the pen in a given test the height of the reservoir can be adjusted relative to the pen 89 so as to meter out a sufficient supply of ink and to avoid flooding of the needle tip.

Figures 6, 12:
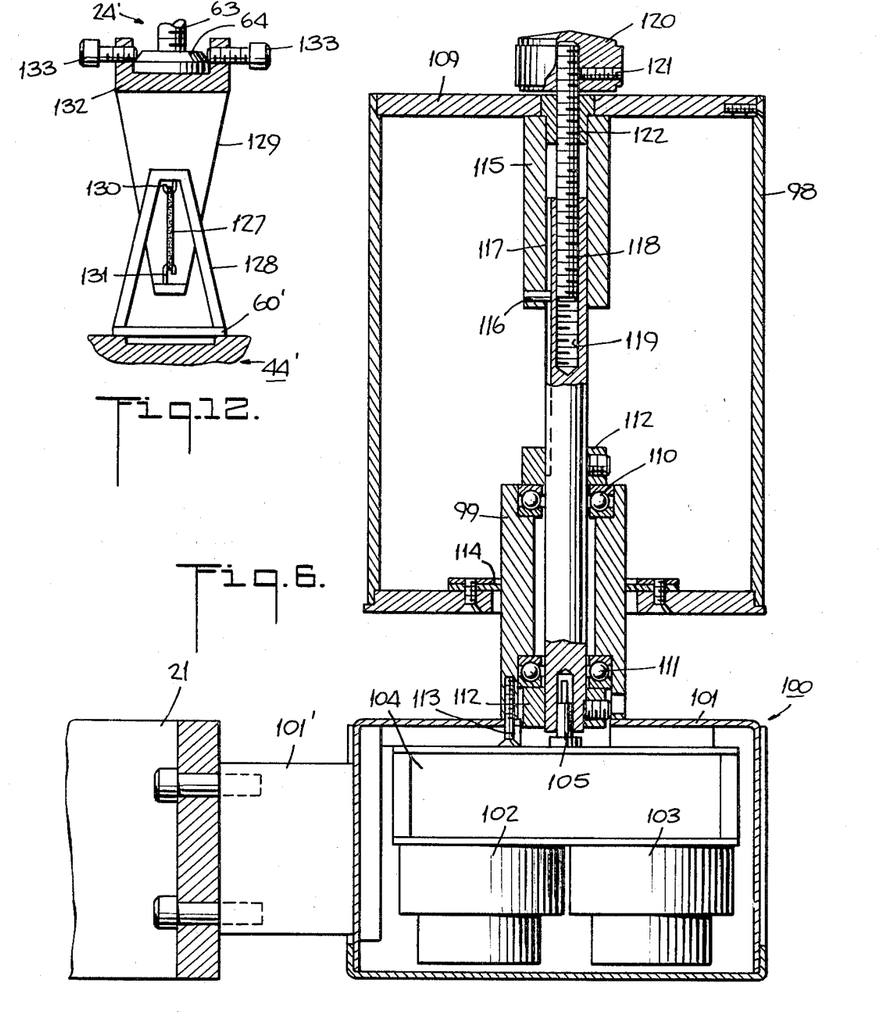
FIG. 6 illustrates a cross-sectional view of the chronograph of the invention taken on line 6—6 of FIG. 1.
FIG. 12 illustrates a fragmentary view of a modified mounting arrangement of the oscillograph for measuring elasticity.

Referring to FIGS. 1 and 6, the chronograph 25 includes a drum 98 which is rotatably mounted on a pedestal 99 and driven through a suitable electric motor 100. The motor 100 is of known construction and is mounted within a housing 101 secured to the pen end of the support 21 by a pair of brackets 101'. The motor 100 further includes a high speed drive 102 and a low speed drive 103 which are connected via a suitable transmission 104 to a common drive shaft 105 for driving the drum 98 at either a high or a low speed rotation. In order to actuate the drives 102, 103, as indicated by a signal light 106 the motor 100 is provided with a pair of manual switches 107 for selective actuation of the desired drive.

Referring to FIG. 6, the pedestal 99 includes a vertically disposed shaft 108 which is clamped to the drive shaft 105 of the motor 100 for rotation therewith. The shaft 108 is journalled in the pedestal 99 by an antifriction thrust bearing 110 at one end and by an antifriction radial and thrust bearing 111 at the other end of the pedestal 99 and held against the bearings 110, 111 by suitable collars 112 fixed to the shaft 108 as shown. In addition, the pedestal 99 is fixed to the motor housing 101 by threaded bolts 113.

In order to mount the drum 98 on the pedestal 99, a Teflon bearing ring 114 is secured within the lower end of the drum 98 and is slidably mounted about the pedestal 99. Also, a sleeve 115 is slidably mounted on the shaft 108. The upper end of the drum 98 is closed by the inserted disc 109 which rests rotably, except for friction due to the weight of drum 98 acting on the interface between disc 109 and sleeve 115, on the upper horizontal surface of sleeve 115. Concentricity of drum 98 and sleeve 115 is maintained by bushing 122 which is a press fit into bushing 115 but is dimensioned to provide rotational freedom for disc 109 which carries drum 98. The sleeve 115 further carries a key 116 which is slidably received in a slot 117 of the shaft 108 in order to permit rotation of the sleeve 115 and drum 95 with the shaft. The drum 98 is thus supported at both ends by slidable bearings coaxial with the shaft 108. Drum 98 thus normally rotates with shaft 108 but may be manually reset into a new rotational position by twisting disc 109 about the bushing 122 whether the shaft 108 is being driven or not. Manual setting of the drum position is part of static load-deflection test procedures.

In order to raise the drum 98 vertically above the pedestal 99, a threaded axial screw 118 is threaded longitudinally into a complementary bore 119 of the shaft 108 and a micrometer head 120 is fixedly secured as by a set screw 121 to the upper end of threaded screw 118. In addition, the bushing 122 is fixed within the top end of the drum 98 for threaded passage of the threaded screw 118 therethrough. In operation, upon being turned in a first direction, the screw 118 raises up out of the shaft 108 and thereby carries the drum 98 via the bushing 122 therewith. Counter rotation of the threaded screw 118 causes movement into the bore 119 of the shaft 108 and consequent downward movement of the drum 98. With this arrangement, the only significant friction on the drum 98 is that of the recording pen 89 and thus only a small frictional drive torque on the sleeve 115 via the key 116 is sufficient to drive the drum 98 by the frictional engagement from the top of sleeve 115 to the underside of disc 109.

It is noted that when the motor 100 is turned off, it is possible to manually adjust the vertical position of the drum 98 independently of the rotation of the drum. That is, the drum 98 can be turned manually through turning of the thumbscrew 120. Otherwise, when the motor 100 is switched on to one of the drives 102, 103, the drum 98 is rotated in a constant horizontal plane about the axis of the shaft 108 by rotation of the shaft 108 through the drive shaft 105 of the transmission 104.

Referring to FIG. 1, in order to record the movements of the beam 23 during a test procedure, a chronograph chart 123 is mounted circumferentially on the drum 95 to receive the markings of the recording pen 89.

Referring to FIG. 1, the operation of the oscillograph is similar to that as described in ASTM standard test method D–945–59. For example, in order to test for resiliency, the coil spring 66 is mounted on the mounting plate platform 60 and the beam 23 is then balanced in order to apply an initial zero load. Thereafter, the beam 23 is locked in an elevated position by engagement of the release hook 83' of the release assembly 83 and the abutment head 64 of the platen assembly 24 is brought down against the spring 66 so as to hold it in a snug relationship. Next, a suitable number of standard weight placed on one of the shafts 72 in an unbalanced arrangement with respect to the beam axis. The member 83' is then pivoted to release the beam 23 so that the beam 23 will pivot under the influence of the weight 73 about the fulcrum of the beam 23 so as to compress the spring 66 against the abutment head 64. The downward movement of the beam 23 is recorded on the chart 123 by the recording pen 89. Thereafter, as the spring 66 expands against the compressing force, the beam 23 is caused to pivot in a counter direction and the upward movement of the pen 89 is recorded on the chart 123. Continued oscillations of the beam 23 under the influence of the weights 73 and the spring 66 are thereafter recorded on the chart 123 in the known manner. After the beam 23 has oscillated until the oscillations are damped out or reach a minimal amount, the test is ended and the beam 23 is again locked in place by re-engagement of the release assembly 83. The chart 123 is then removed from the drum 98 in order for various mathematical computations to be carried out to determine the resiliency and various other characteristics of the spring 66.

It is noted that the support shafts 72 for the weight 73 are spaced at two points from the fulcrum of the beam 23. That is, one shaft is spaced five inches from the fulcrum while the other shaft is spaced ten inches from the fulcrum. This allows different increments of force to be exerted on a test specimen for a given weight.

It is further noted that the invention provides an oscillograph which has a very high degree of precision due in part to the various frictionless mountings of one movable member on another. Because of this precision, the oscillograph can be used to measure significantly various static and dynamic characteristics not only of vulcanized products but also of products such as steel, plastics, sponge material, and the like. It is further noted that the oscillograph can record continuous oscillations of the beam 23 automatically with the drum 98 being driven by means of the motor 100. Additionally, static tests can be run by rotating the drum 98 in increments either manually or through the motor 100.

Referring to FIG. 12, the oscillograph can also be used to measure the elacticity of materials such as a rubber band 127. To this end, the mounting platform 60' of the test specimen mounting assembly 44' is provided with a yoke assembly 128 of U-shaped contour while the abutment head 64 of the platen assembly 24' is provided with a depending yoke assembly 129 of U-shaped configuration. The respective yoke assemblies 128, 129 are arranged in transverse manner to each other such that each passes through the other. Both yoke assemblies 128, 129 are provided with a hook 130, 131, respectively, which serve to mount the ends of a rubber band 127 therebetween.

In order to test the elasticity of the rubber band 127, the band 127 is first secured in place over the hooks 130, 131 and the beam 123 is balanced as described above. Thereafter, with weights in place to the opposite side of the fulcrum, the beam is released so that oscillation can begin. That is, as the beam 23 is released the unbalancing weight on the opposite side of the fulcrum causes the yoke assembly 128 to rise upwardly with respect to the yoke assembly 129 thereby stretching the rubber band 127. Once a point of equilibrium of forces is achieved between the rubber band and the weights, the rubber band 127 contracts so as to return the beam in a counter-direction thereby raising the weights and causing the yoke assembly 128 to move downwardly with respect to the yoke assembly 129. The beam continues to oscillate in this manner until a point of equilibrium is reached or until the operations become minimal for the purposes of the test being carried out.

It is noted that in order to mount the yoke assembly 129 on the abutment head 64, a mounting plate 132 having an annular recess therein is placed over the abutment head 64 and a plurality of threaded screws 133, for example three are threaded inwardly of the mounting plate 132 to engage the upper surface of the mounting abutment head 64.

Referring finally to FIG. 13, in order to provide for testing of the elasticity of certain members such as rubber bands, the oscillograph can be alternatively modified. To this end the yoke assembly 128, as above, is secured to the mounting platforms 60' of the test specimen mounting block and a bar 134 is secured across the columns 61 of the platen assembly 24' to pass through the yoke assembly 128. The shaft 134 is provided with a hook 135 similar to that described above so that the elastic band 127 can be mounted between hook 130, 135. The operation of such a modified oscillograph is as described above.

The invention thus provides an oscillograph of a high degree of precision which can be very easily and quickly utilized to test a material for various types of characteristics. For example, the oscillograph can be used for static and dynamic testing of the broad range of elastic, damping and flow characteristics including resilience, dynamic modulus, static modulus, kinetic energy, creep and set. In the testing of elastomers, the oscillograph can utilize the various methods which have been known in the past, for example, Federal Test Method Standards No. 601 for resilience, method 3411. The oscillograph is capable of measuring the compression properties of cured standard test pieces of elastomers one-half inch high by three-quarters inch in diameter in both static and dynamic evaluations per ASTM D–945 up to 280 p.s.i. for 14 weights as provided in steps of 20 p.s.i. Half weights and quarted weights further can be used to reduce the steps to 10 p.s.i. and 5 p.s.i. Similar capabilities are available to measure shear properties of cured standard double shear specimens of elastomers.

Because the oscillograph of the invention can be used over the entire spectrum of elastic materials and systems within the load and deformation limits of the machine, it has great utility in making practical evaluations of competitive design approaches and costs for a given performance. In engineering laboratories, the oscillograph can have a great utility in making full analysis of practical design options.

The oscillograph of the invention is further a most versatile and accurate machine for mechanical testing.

It is further noted that the oscillograph is formed with a number of leveling screws and spirit level so that the beam support 21 can be leveled into a horizontal plane as is known. Furthermore, in order to transport the oscillograph from place to place a pair of mounting blocks, for example, of wood, can be secured between the support and the beam so as to raise the beam from the support. This will prevent any undue force on the knife edges during transportation of the oscillograph.

What is claimed is:

1. In combination with an oscillograph comprising a support, a beam pivotally mounted on said support at a fulcrum point, a test specimen mounting block pivotally mounted on said beam on one side of said fulcrum point, weight mounting means on said beam on the opposite side of said fulcrum point, recording pen means mounted on said beam on said opposite side of said fulcrum point, and a platen assembly fixedly mounted above said test specimen mounting block; a first pivot bearing between said beam and said support pivotally mounting said beam on said support at said fulcrum point, said first pivot bearing including a knife edge fixed on said beam and a knife edge receiving means fixed on said support, said receiving means including a pair of inserts having interengaging digitated ends and inclined surfaces forming a V-shaped groove receiving said knife edge therein, a second pivot bearing between said beam and said test specimen mounting block, said second pivot bearing including a second knife edge on said beam and a second knife edge receiving means fixed on said mounting block, said second receiving means including a pair of inserts in said block having interengaging digitated ends and inclined surfaces forming a V-shaped groove receiving said knife edge therein, a pair of depending arms on opposite sides of said mounting block, a cross bar secured between the lower ends of said arms and a link hingedly mounted on said cross bar and said support in parallel relation to said beam for maintaining said test specimen mounting block in a horizontal plane upon pivoting of said beam.

2. The combination as set forth in claim 1 wherein said cross bar and said support has a bearing spool fixed thereon, each said spool hingedly receiving one end of said link thereon.

3. The combination as set forth in claim 2 wherein said link has an aperture at each end receiving a respective bearing spool therein, the distance between said apertures being equal to the distance between said first and said second knife edges.

4. The combination as set forth in claim 3 wherein said link has a chamfered surface about each aperture therein forming a knife edge.

5. The combination as set forth in claim 4 wherein each spool has a peripheral groove therearound inclined in a downward direction and receiving a respective knife edge of said link.

6. The combination as set forth in claim 1 wherein said mounting block includes a specimen receiving platform in the upper surface thereof offset from the axis of said arms to impose a torque on said link.

7. The combination as set forth in claim 1 wherein each of said arms includes a ball bearing therein in the plane of the bottom of said V-shaped groove and a spring biasing said ball bearing against said inserts.

8. In combination with an oscillograph comprising a support, a beam pivotally mounted on said support at a fulcrum point, a test specimen mounting block pivotally mounted on said beam on one side of said fulcrum point, weight mounting means on said beam on the opposite side of said fulcrum point, recording pen means mounted on said beam on said opposite side of said fulcrum point, and a platen assembly fixedly mounted above said test specimen mounting block; a pivot bearing between said beam and said support pivotally mounting said beam on said support at said fulcrum point, said pivot bearing including a knife edge fixed on said beam and a knife edge receiving means fixed on said support, said receiving means including a pair of inserts having interengaging digitated ends, and inclined surfaces forming a V-shaped groove receiving said knife edge therein; and a chronograph mounted on said support adjacent said recording pen means, said chronograph including a drum rotatably mounted therein, means for driving said drum, a shaft connected to said drive means for rotation thereby, a first bushing fixedly secured to said drive means concentrically of said shaft, a bearing fixed at the lower end of said drum in slidable relation to said first bushing, a second bushing frictionally fixed to the upper end of said drum slidably mounted on said shaft, and key means in said second bushing and said shaft for keying said second bushing to said shaft for rotation therewith.

9. The combination as set forth in claim 8 wherein said chronograph further includes a threaded screw vertically mounted in said shaft longitudinally thereof, said screw being threadably received in said drum at the upper end thereof whereby rotation of said threaded screw relative to said shaft causes vertical sliding of said drum relative to said shaft.

10. An oscillograph comprising a support, a beam pivotally mounted on said support at a fulcrum point, a test specimen mounting block pivotally mounted on said beam on one side of said fulcrum point, a yoke means depending from said mounting block, a link hingedly secured to said yoke at the lower end and being of a length to maintain said yoke in a vertical plane, a platen assembly fixedly mounted above said test specimen mounting block, and a recording pen means on the opposite side of said fulcrum point extending from said beam for recording movements of said beams.

11. An oscillograph as set forth in claim 10 wherein said test specimen mounting block includes a mounting platform at the upper end thereof offset from the vertical axis of said depending arms in a direction away from said fulcrum point whereby a torque is imposed on said yoke to squeeze said link between said yoke and said support.

12. An oscillograph as set forth in claim 10 further comprising a shaft mounted transversely of said beam on the opposite side of said fulcrum point for receiving standard weights thereon.

13. An oscillograph as set forth in claim 12 wherein said shaft is of polygonal cross section.

14. An oscillograph as set forth in claim 12 which further includes a mounting block on said means mounting said shaft therein, said mounting block including a pair of holes therein for receiving a pair of pins secured on a standard weight for preventing rotation of the weight on said shaft.

References Cited

UNITED STATES PATENTS

| | | | |
|---|---|---|---|
| 568,582 | 9/1896 | Richards | 308—2 |
| 1,785,702 | 12/1930 | Osborne | 308—2 |
| 1,792,942 | 2/1931 | Taylor | 308—2 |
| 1,806,179 | 5/1931 | Reeves | 308—2 |
| 2,800,385 | 7/1957 | Cannon | 346—140 |
| 3,354,701 | 11/1967 | Yerzley et al. | 73—88 |

JERRY W. MYRACLE, Primary Examiner

U.S. Cl. X.R.

346—138